(12) United States Patent
Fuchigami

(10) Patent No.: US 7,941,006 B2
(45) Date of Patent: May 10, 2011

(54) PIXEL INTERPOLATING METHOD AND DEVICE

(75) Inventor: Ikuo Fuchigami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 942 days.

(21) Appl. No.: 11/883,946

(22) PCT Filed: Feb. 17, 2006

(86) PCT No.: PCT/JP2006/003363
§ 371 (c)(1),
(2), (4) Date: Aug. 8, 2007

(87) PCT Pub. No.: WO2006/090811
PCT Pub. Date: Aug. 31, 2006

(65) Prior Publication Data
US 2008/0166068 A1    Jul. 10, 2008

(30) Foreign Application Priority Data

Feb. 25, 2005    (JP) ................................. 2005-050421

(51) Int. Cl.
G06K 9/32    (2006.01)
(52) U.S. Cl. ........ 382/300; 382/299; 345/698; 358/525; 708/290; 708/313
(58) Field of Classification Search .................. 382/299, 382/300; 345/698–699; 705/290, 313; 358/525; 708/290, 313
See application file for complete search history.

(56) References Cited

U.S. PATENT DOCUMENTS 5,257,355 A    10/1993    Akamatsu
6,810,156 B1 *    10/2004    Itoh ............................... 382/300
(Continued)

FOREIGN PATENT DOCUMENTS

JP    7-15734    1/1995
(Continued)

OTHER PUBLICATIONS

Wen-Nung Lie, Han-Ching Yeh, Tom C.I. Lin, and Chien-Fa Chen, "Hardware-Efficient Computing Architecture for Motion Compensation Interpolation in H.264 Video Coding" IEEE International Symposium on Circuits and Systems, IEEE, vol. 3, May 2005, pp. 2136-2139.*

(Continued)

Primary Examiner — Matthew C Bella
Assistant Examiner — Eric Rush
(74) Attorney, Agent, or Firm — Wenderoth, Lind & Ponack, L.L.P.

(57) ABSTRACT

The n-tap filtering for generating interpolated pixels is converted into calculation of terms consisting of the difference and sum of the pixel values of adjoining pixels. When the difference is equal to or less than a predetermined value, the calculation related to the terms including the difference is omitted, thereby reducing the calculation amount in generating the interpolated pixels. In loop processing according to a flow chart of the pixel interpolating method, the reference pixels are accessed by one pixel per one loop processing for reading pixel values thereof, and the difference and sum of the pixel values are calculate using the adjoining pixel value already read one loop before, thereby interpolating the pixel values of consecutive pixels to be interpolated. Consequently, redundant reading of pixel values is avoided, with further beneficial effects on speedy generation of the interpolated pixels and reduction of the power consumption therein.

8 Claims, 9 Drawing Sheets

U.S. PATENT DOCUMENTS 7,561,204 B1 * 7/2009 Honda ............................ 382/300
2006/0291563 A1 * 12/2006 Park et al. ................. 375/240.17

FOREIGN PATENT DOCUMENTS

| JP | 2002-190948 | 7/2002 |
|----|-------------|--------|
| JP | 2004-96757  | 3/2004 |

OTHER PUBLICATIONS

Kyeounsoo Kim et al., "A High-Performance Low-Power Asynchronous Matrix-Vector Multiplier for Discrete Cosine Transform", ASICS, 1999, AP-ASIC '99, The First IEEE Asia Pacific Conference on Seoul, South Korea Aug. 23-25, 1999, Piscataway, NJ, USA, IEEE, US, Aug. 23, 1999, pp. 135-138, XP010371862, ISBN: 0-7803-5705-1.

Kazushi Sato et al., "Adaptive MC Interpolation for Memory Access Reduction in JVT Video Coding", Proceedings, Seventh International Symposium on Signal Processing and its Applications, 2003, vol. 1, Jul. 1, 2003-Jul. 4, 2003, pp. 77-80, XP002394465.

A. Tamhankar et al., "An Overview of H.264 / MPEG-4 Part 10", Proceedings of Multimedia Communications, IOS Press, Amsterdam, NL, vol. 1, Jul. 2, 2003, pp. 1-51, XP008034260.

Joint Video Team (JVT) of ISO/IEC MPEG & ITU-T VCEG, "Draft ITU-T Recommendation and Final Draft International Standard of Joint Video Specification (ITU-T Rec.H.264/ISO/IEC 14496-10 AVC)," Section 8.4.2.2, 2002.

* cited by examiner

Fig. 2

| read pixel | reference pixel value | b[m-3] | b[m-2] | b[m-1] | b[m] | b[m+1] | b[m+2] | b[m+3] | b[m+4] | → |
|---|---|---|---|---|---|---|---|---|---|---|
| a[k-7] | a[k-8] | 1 | | | | | | | | |
| a[k-6] | a[k-7] | -4 | 1 | | | | | | | |
| a[k-5] | a[k-6] | 16 | -4 | 1 | | | | | | |
| a[k-4] | a[k-5] | 4 | 16 | -4 | 1 | | | | | |
| a[k-3] | a[k-4] | -1 | 4 | 16 | -4 | 1 | | | | |
| a[k-2] | a[k-3] | | -1 | 4 | 16 | -4 | 1 | | | |
| a[k-1] | a[k-2] | | | -1 | 4 | 16 | -4 | 1 | | |
| a[k] | a[k-1] | | | | -1 | 4 | 16 | -4 | 1 | |
| a[k+1] | a[k] | | | | | -1 | 4 | 16 | -4 | 1 |
| a[k+2] | a[k+1] | | | | | | -1 | 4 | 16 | -4 |
| a[k+3] | a[k+2] | | | | | | | -1 | 4 | 16 | intermediate pixel value of interpolated pixel

PIXEL INTERPOLATING METHOD AND DEVICE

TECHNICAL FIELD

The present invention relates to tap filter processing operable to determine interpolated pixel values of pixels in a digital picture, especially a pixel interpolating method that is used in encoding/decoding processing for motion pictures by inter-picture prediction encoding.

BACKGROUND ART

Inter-picture prediction encoding using correlation between pictures is employed in high-efficient, high-compressed encoding of a motion picture. The inter-picture prediction encoding is also employed in encoding standards such as MPEG-2, MPEG-4 (Part 2), and H.264|MPEG-4 (Part 10) AVC (it is simply referred to as H.264 hereafter). In these encoding standards, a present picture is divided into rectangular pixel blocks, each of which consists of a plurality of pixels, and the plurality of pixels are processed per block. The inter-picture prediction encoding generates a motion vector and a predicted block: the motion vector shows motion between a block on the present picture and a block on a reference picture that is a reference target; and the predicted block is a block that has undergone motion compensation based on the block on the reference picture. The inter-picture prediction encoding then performs encoding for the difference between the pixel values of pixels of the predicted block and those of the block on the present picture.

In order to acquire the better encoding efficiency by increasing the accuracy of the predicted picture generated by the above-mentioned motion compensation, each component of the motion vector is expressed in a subdivided unit that is smaller than a full-pel, such as a half-pel and a quarter-pel. In the motion compensation, generation of a predicted picture from a reference picture requires the interpolating processing of pixels, and the calculation method thereof is defined by each of the encoding standards.

According to H.264, one of the encoding standards, 6-tap filtering as a method of the above-mentioned interpolating processing of pixels is specified by Document 1 (Joint Video Team (JVT) of ISO/IEC MPEG & ITU-T VCEG; "Draft ITU-T Recommendation and Final Draft International Standard of Joint Video Specification (ITU-T Rec.H.264|ISO/IEC 14496-10 AVC)", refer to Section 8.4.2.2).

The 6-tap filtering is explained briefly now. The 6-tap filter includes tap coefficients {1, −5, 20, 20, −5, 1}. Expressing a pixel value of a pixel at i-th location as a[i] (i: integer), among pixels aligned along a horizontal or vertical line on the reference picture, a pixel value for an interpolated pixel at $(k+\frac{1}{2})$th location is calculated as follows. First, according to Equation 1, an intermediate pixel value "b" of the interpolated pixel is calculated. Then, according to Equation 2, normalization and saturation manipulation are performed for the intermediate pixel value "b", and a pixel value "c" is calculated as the final pixel value of the interpolated pixel.

$$b = a[k-2] - 5*a[k-1] + 20*a[k] + 20*a[k+1] - 5*a[k+2] + a[k+3] \quad \text{(Equation 1)}$$

$$c = \text{Clip}((b+16)/32) \quad \text{(Equation 2)}$$

FIG. 8 shows location relationship of the pixels of the reference picture, that is, the pixels such as full-pels, interpolated half-pels, and interpolated quarter-pels (Document 1: FIGS. 8-4). In the figure, pixels "A" to "U", each surrounded with a circle, are full-pels. Pixels "b", "h", "j", "m", "s", and "aa" to "hh", each surrounded with a square, are half-pels. The remaining pixels "a", "c", "d", "e", "f", "g", "i", "k", "n", "p", "q", and "r", each surrounded with a square, are quarter-pels.

In this example, the pixel values of the pixels "b" and "s" can be calculated by performing the above-mentioned 6-tap filtering to the pixel values of the pixels aligned along a horizontal line on which each of the pixels "b" and "s" is located. The pixel values of the pixels "h" and "m" can be calculated by performing the 6-tap filtering to the pixel values of the pixels aligned along a vertical line on which each of the pixels "h" and "m" is located. The pixel value of the pixel "j" can be calculated by performing 6-tap filtering in the vertical direction to the pixel values of six pixels "aa", "bb", "b", "s", "gg", and "hh", which are calculated by the 6-tap filtering in the horizontal direction. Alternatively the pixel value of the pixel "j" can be calculated by reversing the order of the filter direction and performing the 6-tap filter in the horizontal direction to the pixel values of the six pixels "cc", "dd", "h", "m", "ee", and "ff", which are calculated by the 6-tap filtering in the vertical direction.

The pixel value of a quarter-pel can be calculated by the average of the two pixel values of the adjoining half-pels or full-pels. For example, the pixel value of a pixel "a" is calculated by the average of the pixel value of a full-pel "G" and the pixel value of a half-pel "b"; the pixel value of a pixel "e" is calculated by the average of the pixel value of the half-pel "b" and the pixel value of a half-pel "h"; and the pixel value of a pixel "f" is calculated by the average of the pixel value of the half-pel "b" and the pixel value of a half-pel "j".

When generating a predicted picture by performing the interpolating processing based on the above-mentioned 6-tap filtering, a lot of processing amount is required in order to calculate a pixel value of an interpolated pixel. For example, when the interpolated pixel is any one of the pixels "f", "i", "j", "k", and "q", operation is performed for the pixel values of as many as 36 full-pels. The interpolating processing needs to be performed as many as the number of the pixels included in the predicted blocks, furthermore, the predicted blocks include all the blocks for which inter-picture prediction is performed; therefore, the motion compensation processing requires a tremendous amount of operation in motion picture encoding or decoding.

FIG. 9 is a flow chart showing an example of the conventional pixel interpolating method of calculating a pixel value of an interpolated pixel by the above-mentioned 6-tap filter. In the following, the conventional pixel interpolating method shown in FIG. 9 is explained.

When the interpolating processing starts at Step S0, initial values are allotted to variables "m" and "k" at Step S1. Here, the variable "k" is an index for reading the pixel value of a target reference pixel from an array "a" storing the pixel values of pixels which constitute a reference picture. In correspondence to the above-mentioned FIG. 8, for example, in a case for calculating the pixel value of the interpolated pixel "b", the variable "k" indicates the full-pel "J". The variable "m" is an index that indicates a location of the interpolated pixel in the predicted block. A variable "i" is an index indicating the reference point to be used in reading the pixel value of the reference pixel. More specifically, the variable "i" indicates a full-pel located on the upper left of an interpolated pixel to be calculated first. In the example shown in FIG. 8, the variable "i" indicates the pixel "G".

At Step S2, the pixel values of five reference pixels beginning from the edge of the reference area are read. This processing is a preparatory step for calculating the pixel value of the first interpolated pixel.

At Step S3, the pixel value of the reference pixel located at the variable "k" is read.

At Step S4, an intermediate pixel value "b" of the interpolated pixel is calculated by Equation 1.

At Step S5, according to Equation 2, normalization and saturation manipulation of the intermediate pixel value "b" are performed to calculate the pixel value "c" of the interpolated pixel. The normalization means to divide the intermediate pixel value "b", which is calculated by Equation 1, by a value "32". The function Clip (x) is a function suppressing (clipping) a variable "x" within a range of 0 to 255, when the variable "x" exceeds the range of 0 to 255.

At Step S6, the pixel value "c" of the interpolated pixel calculated at Step S5 is outputted.

At Step S7, for the next loop, the variable "m" and the variable "k" are incremented by the value "1", respectively.

At Step S8, whether or not the number of the generated interpolated pixels has reached the predetermined number "N" is judged. When the judgment result is "No" (it has not reached the predetermined number "N"), the control is returned to Step S3, and Step S3 to Step S8 are repeated. When the judgment result is "Yes" (it has reached the predetermined number "N"), the control is advanced to Step S9, and a series of the pixel interpolating processing ends.

As mentioned above, every time when loop processing from Step S3 to Step S8 of FIG. 9 is performed, the pixel value of one interpolated pixel is calculated.

FIG. 10 shows a block diagram of a conventional pixel interpolating device using a 6-tap filter. FIG. 10 illustrates the 6-tap filter which is constructed so as to be used for the above-mentioned interpolating processing, based on the structure of a tap filter disclosed by Document 2 (Published Japanese patent application No. H07-15734). As shown in FIG. 10, the conventional pixel interpolating device comprises registers (symbolized as "R" in the figure) 1 to 6, multiplying units (symbolized as "M") 7 to 10, adding units (symbolized as "+") 11 and 12, and a clipper 13. The registers 1 to 6 constitute a shift register with input of a pixel value "a [k]" of a reference pixel.

The operation of the conventional pixel interpolating device shown in FIG. 10 is explained in the following.

In the shift register of the registers 1 to 6, by performing shift operation in synchronization with a shift control signal (not shown in the figure) and transferring, step by step, the inputted pixel value "a[k]" of the reference pixel, the pixel values of six consecutive reference pixels are stored one by one in the registers. The multiplying units 7 to 10 multiply the respective pixel values of the reference pixels stored in the registers 2 to 5 and the respectively predetermined coefficients (a coefficient "−5" for the multiplying units 7 and 10, and a coefficient "20" for the multiplying units 8 and 9) shown in the figure, thereby obtaining the respective products. The adding unit 11 adds the value stored in the register 1, the value stored in the register 6, and the product values stored in the multiplying units 7 to 10, thereby calculating the total sum. The adding unit 12 adds a constant "16" to the total sum calculated by the adding unit 11. The clipper 13 performs saturation manipulation, and outputs the pixel value "c" of the interpolated pixel. By inputting the pixel values of the reference pixels, step by step, according to the shift control signal, the pixel value "c" of each of the consecutive interpolated pixels can be calculated by the 6-tap filtering using Equation 1 and Equation 2, as mentioned above.

Since the multipliers in the above multiplication are the predetermined constants, the multiplying units 7 to 10 can be constructed by units functioning bit-shift, addition, and sign change. The multiplying units 7 to 10 thus constructed are smaller in circuit scale than the regular multiplier.

In the pixel interpolating device in which the conventional pixel interpolation method is adopted as explained above, there is a limit regarding the high-speed processing in software processing and the power consumption reduction, because the operation amount is constant irrespective of the pixel values of reference pixels and no measure is taken for reducing the operation amount by considering the pixel values.

As a method of improvement in speed, Document 3 (Published Japanese patent application No. 2002-190948) discloses an art to use a look-up table which stores the multiplication result, thereby reducing the operation load. However, this method has a problem of the circuit scale enlarged as the result of installing the look-up table therein.

As explained above, the conventional pixel interpolating method and the conventional pixel interpolating device can not fully deal with the following problem.

In order to meet the request of producing a high-quality motion picture with a high-definition picture and increased frame rate, pixels to be processed per unit time needs to be increased in number. However, in the conventional art, there is a limit for the processing speed; therefore, it is difficult to improve the speed of the motion compensation.

Moreover, when an art of motion picture encoding/decoding accompanied by such pixel interpolating processing is used for portable devices such as a cellular phone, decreasing the power consumption imposes another great concern, since there is a limit for the power supply used in these portable devices.

SUMMARY OF THE INVENTION

An object of the present invention is to provide a pixel interpolating method and a pixel interpolating device, operable to improve the speed of pixel interpolating processing and to decrease the power consumption therein.

A first aspect of the present invention provides a pixel interpolating method using tap filtering, comprising: adding one of pixel values of an adjoining pixel pair composed of two adjoining reference pixels to another of the pixel values thereof, thereby obtaining a pixel value sum of the adjoining pixel pair; subtracting one of the pixel values of the adjoining pixel pair from another of the pixel values thereof, thereby obtaining a pixel value difference of the adjoining pixel pair; judging whether an absolute value of the pixel value difference is greater than a predetermined value, thereby generating a judgment result; and performing a first multiplication to multiply a first coefficient to the pixel value sum, thereby obtaining a first product. When the judgment result is indicative that the absolute value of the pixel value difference is greater than the predetermined value, the pixel interpolating method further comprises: performing a second multiplication to multiply a plurality of second coefficients to the pixel value difference, thereby obtaining a plurality of second products; and performing a first addition/subtraction of the first product and the plurality of second products to each of a plurality of registers, thereby accumulating interpolated pixel values of a plurality of contiguous pixels to be interpolated, each of the plurality of registers being arranged in correspondence to each of the plurality of contiguous pixels to be interpolated. When the judgment result is indicative that the absolute value of the pixel value difference is equal to or smaller than the predetermined value, the pixel interpolating method further comprises: performing a second addition/subtraction of the first product to corresponding one of the plurality of registers, thereby accumulating interpolated pixel values of the plurality of contiguous pixels to be interpolated.

According to the present structure, when the absolute value of the pixel value difference of the adjoining pixel pairs is equal to or less than the predetermined value, the pixel interpolating method provided herein is operable to omit the processing of the second multiplication step pertaining to the pixel value difference of these adjoining pixels and the processing of addition or subtraction of the second product to the register. Therefore, the pixel interpolating processing can be performed at higher speed as much as a time otherwise needed for the omitted steps of processing.

A second aspect of the present invention provides the pixel interpolating method as defined in the first aspect, wherein the adding, the subtracting, the judging, the performing the first multiplication, the performing the second multiplication, the performing the first addition/subtraction, and the performing the second addition/subtraction are practiced to a plurality of adjoining pixel pairs in addition to the adjoining pixel pair, thereby obtaining each of the interpolated pixel values of the plurality of contiguous pixels to be interpolated.

According to the present structure, the pixel values of the plurality of the interpolated pixels within a block can be obtained by a series of processing.

A third aspect of the present invention provides the pixel interpolating method as defined in the first aspect, wherein the predetermined value is equal to or smaller than a value defined by a lowest bit in binary representation of each pixel value of the pixels composing the adjoining pixel pair.

According to the present structure, when the absolute value of the pixel value difference of the adjoining pixel pairs is equal to the value "0", or equal to or less than the value indicated by the least significant bit when the pixel value is represented in a binary code, the pixel interpolating method provided herein is operable to omit the processing of the second multiplication step pertaining to the pixel value difference of these adjoining pixels and the processing of addition or subtraction of the second product to the register.

A fourth aspect of the present invention provides the pixel interpolating method as defined in the first aspect, wherein the first coefficient and the plurality of second coefficients are coefficients composed of exponentiations of 2, wherein the performing the first multiplication bit-shifts the pixel value sum by a value of exponent of the first coefficient, and wherein the performing the second multiplication bit-shifts the pixel value difference by a value of exponent of a corresponding one of the plurality of second coefficients.

According to the present structure, the multiplying operation can be performed at higher speed than the regular multiplier.

A fifth aspect of the present invention provides the pixel interpolating method as defined in the first aspect, wherein the tap filtering employs tap coefficients of {1, −5, 20, 20, −5, 1} and performs filtering based on the tap coefficients, by using an expression of $$b[k]=((a[k-2]-a[k-1])-4*(a[k-1]-a[k])+16*(a[k]+a[k+1])+4(a[k+1]-a[k+2])-(a[k+2]-a[k+3]))/32,$$

where a[k] is a pixel value of a pixel located at a k-th position of the plurality of reference pixels, b[k] is an interpolated pixel value of a pixel located at a k-th position of the plurality of contiguous pixels to be interpolated, and the variable "k" is an integer indicative of a position from a certain pixel as a reference point.

According to the present structure, the pixel interpolating processing in conformity to H.264|MPEG-4 AVC can be performed.

A sixth aspect of the present invention provides the pixel interpolating method as defined in the fifth aspect, wherein the tap filtering comprises: a first step to input the pixel value a[k]; a second step to calculate a difference and sum of the pixel value a[k] and a pixel value of an adjacent pixel a[k−1] stored in a first register of the plurality of resisters, thereby storing the difference to a second register of the plurality of resisters, and storing the sum to a third register of the plurality of resisters after left-shifting by 4 bits; a third step to judge whether an absolute value of the difference is greater than a predetermined value, thereby generating a judgment result; a fourth step to subtract a value stored in the second register from a value stored in a fourth register of the plurality of resisters; a fifth step to left-shift a value stored in the second register by 2 bits, thereby adding the left-shifted value to a fifth register of the plurality of resisters, and subtracting the left-shifted value from a sixth register of the plurality of resisters; and a sixth step to output a value stored in the fourth register as the interpolated pixel value of the pixel located at the k-th position, and to store the pixel value a[k] to the first register. When the judgment result is indicative that the absolute value of the difference is greater than the predetermined value, a series of loop processing composed of the first, the second, the third, the fourth, the fifth, and the sixth steps is practiced. When the judgment result is indicative that the absolute value of the difference is equal to or smaller than the predetermined value, a series of loop processing composed of the first, the second, the third, and the sixth steps is practiced.

According to the present structure, the pixel interpolating processing in conformity to H.264|MPEG-4 AVC can be performed efficiently and easily, by tap filtering with tap coefficients given by {1, −5, 20, 20, −5, 1}.

An eighth aspect of the present invention provides a pixel interpolating device comprising: an adding unit operable to add one of pixel values of an adjoining pixel pair composed of two adjoining reference pixels to another of the pixel values thereof, thereby obtaining a pixel value sum of the adjoining pixel pair; a subtracting unit operable to subtract one of the pixel values of the adjoining pixel pair from another of the pixel values thereof, thereby obtaining a pixel value difference of the adjoining pixel pair; a judging unit operable to judge whether an absolute value of the pixel value difference is equal to or smaller than a predetermined value; a plurality of registers; a first multiplying unit operable to multiply a predetermined coefficient to the pixel value sum; a second multiplying unit operable to multiply a predetermined coefficient to the pixel value difference; and a plurality of adding/subtracting units which are operable to add to or subtract from each of the plurality of registers the pixel value difference calculated by the subtracting unit or the multiplication results calculated by the first multiplying unit and the second multiplying unit, and to send the calculation results to respectively subsequent ones of the plurality of registers. When the judgment unit determines that the absolute value of the pixel value difference is equal to or smaller than the predetermined value, the judgment unit controls the second multiplying unit and the plurality of adding/subtracting units to skip processing related to the adjoining pixel pair for which the absolute value of the pixel value difference is judged to be equal to or smaller than the predetermined value.

According to the present structure, when the absolute value of the pixel value difference of the adjoining pixel pair is equal to or less than the predetermined value, a pixel interpolating device provided herein is operable to omit the multiplication processing of the second multiplying unit pertaining to the pixel value difference of these adjoining pixels, and also operable to omit the pertaining processing of addition or subtraction of a plurality of adding/subtracting units. Therefore, when the pixel interpolating device according to the present structure is used, speedy generation of predicted pictures in motion compensation can be realized, owing to the reduction of the operation amount with accompanied suppressing effect in the power consumption.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a descriptive illustration showing a pixel interpolating method in Embodiment 1 of the present invention;

DETAILED DESCRIPTION OF THE INVENTION

Next, embodiments of the present invention are explained referring to the accompanying drawings.

Embodiment 1

Figure 1:
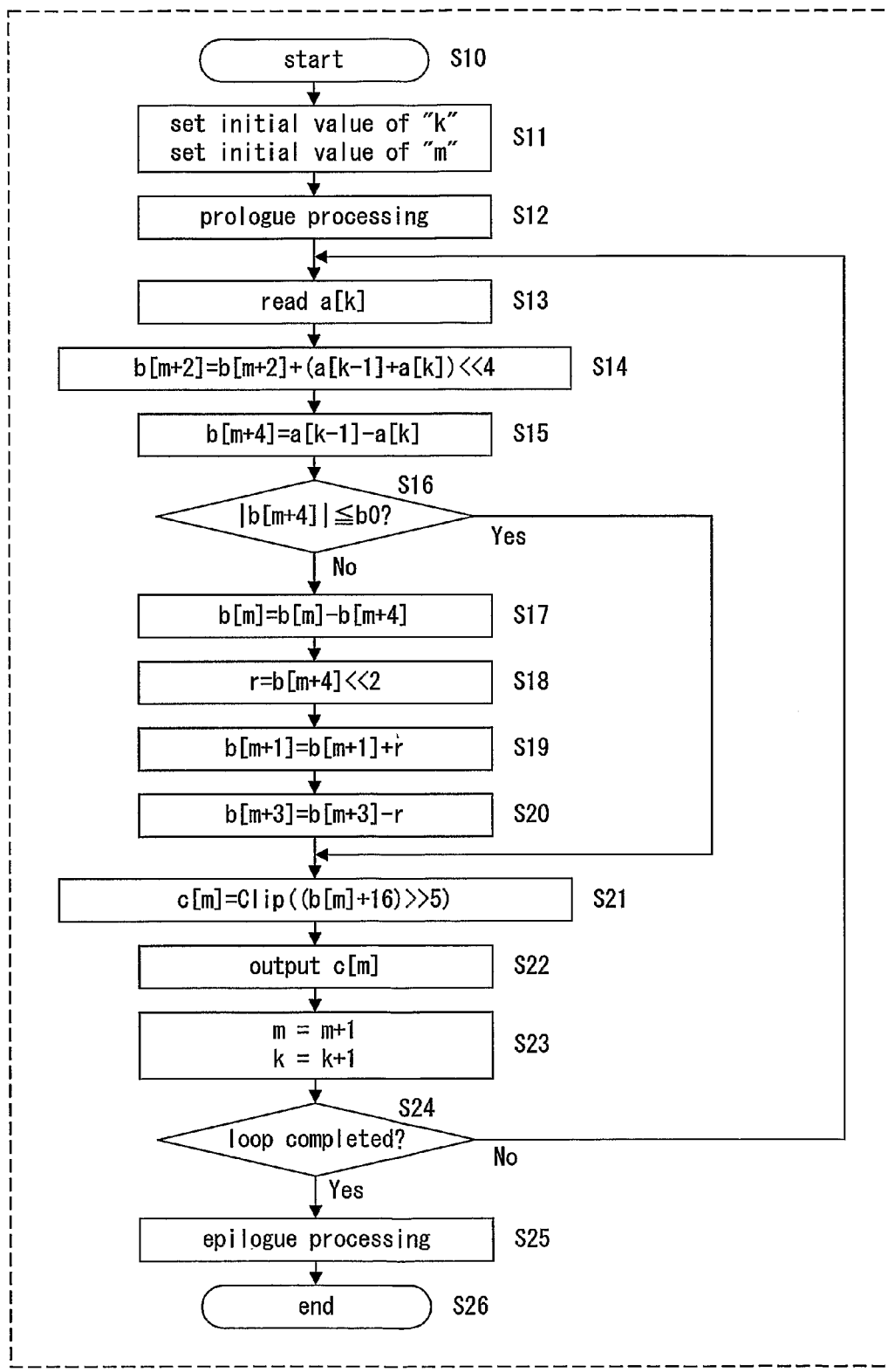
FIG. 1 is a flow chart of a pixel interpolating method in Embodiment 1 of the present invention.

FIG. 1 is a flow chart of a pixel interpolating method in Embodiment 1 of the present invention. The flow chart shown in FIG. 1 is an example of the pixel interpolating method of the present embodiment.

FIG. 2 is a descriptive illustration showing the pixel interpolating method in Embodiment 1 of the present invention.

First, basic ideas with which the present inventor has come up for the pixel interpolating method of the present embodiment are explained.

According to the pixel interpolating method of the present embodiment, the pixel value of an interpolated pixel is calculated by filtering pixel values of pixels of the reference picture with a 6-tap filter having tap coefficients (1, −5, 20, −5, 1).

Assume that $a[k]$ is the pixel value of a (k)th full-pel located at the (k)th position among pixels aligning on a horizontal or vertical line of the reference picture, and that a pixel value "c" is a pixel value of a half-pel to be interpolated, which is located at the (k+½) position in between the (k)th full-pel and the (k+1)th full-pel. Then, the pixel value "c" can be calculated by obtaining an intermediate pixel value "b" by Equation 1 and putting the value "b" into Equation 2 for normalization and saturation manipulation.

As shown in Equation 3, the right hand term of Equation 1 can be replaced by a form of summation of terms of $(a[k-2]-a[k-1])$, $(a[k-1]-a[k])$, $(a[k+1]-a[k+2])$, and $(a[k+2]-a[k+3])$, which represent differences of the pixel values of respectively adjoining reference pixels, and $(a[k]+a[k+1])$, which represents a sum of the pixel values of another pair of adjoining reference pixels.

$$b = (a[k-2] - a[k-1]) - \\ 4*(a[k-1] - a[k]) + 16*(a[k] + a[k+1]) + \\ 4*(a[k+1] - a*[k+2]) - (a[k+2] - a[k+3]) \quad \text{(Equation 3)}$$

Furthermore, as the result of replacement by the form of Equation 3, the coefficients of the multiplication to the pixel value differences of the adjoining pixels become coefficients "1", "−4", "4", and "−1" respectively, and the coefficient of the multiplication to the pixel value sum of the adjoining pixels becomes a coefficient "16". As a result, the multiplication by the coefficients "4" and "16" can be substituted by left bit-shift operation by the amount of 2 bits and 4 bits, respectively, since the coefficients "4" and "16" are the second and fourth powers of 2, respectively. Therefore, Equation 3 is rewritten as Equation 4.

$$b = (a[k-2] - a[k-1]) - \\ \{(a[k-1] - a[k]) << 2\} + \{(a[k] + a[k+1]) << 4\} + \\ \{(a[k+1] - a*[k+2]) << 2\} - (a[k+2] - a[k+3]) \quad \text{(Equation 4)}$$

where, the operator "<<" denotes the left bit-shift operation.

Furthermore, the division by the value "32" in Equation 2 can be substituted by right bit-shift operation by the amount of 5 bits, since the value "32" is the fifth power of 2. Therefore, Equation 2 is rewritten as Equation 5.

$$c = \text{Clip}((b+16) >> 5) \quad \text{(Equation 5)}$$

where, the operator ">>" denotes the right bit-shift operation.

As a result, the pixel value "c" of the interpolated pixel can be calculated by inputting into Equation 5 the intermediate pixel value "b", which is calculated by Equation 4.

As explained above, in calculating the pixel value of the interpolated pixel by converting Equation 1 and Equation 2 into the forms of Equation 4 and Equation 5, the terms of multiplication and division by coefficients can be respectively performed by a single bit-shift operation, thereby it is possible to make the operation lighter.

According to the above-mentioned consideration, in the pixel interpolating method of the present embodiment, processing of the interpolating pixels is performed based on the form of Equation 4, wherein the operation terms consist of the subtraction and addition of the pixel values of the adjoining pixels.

In the following, the interpolating method of the present embodiment is explained referring to FIG. 1 and FIG. 2.

In the table shown in FIG. 2, the numerical values denote coefficients of the right hand terms of Equation 3, the rows indicate sets of adjoining pixels to be referred to, and the columns indicate intermediate pixel values of the interpolated pixels to be calculated.

Calculation of the pixel value of an interpolated pixel is performed along a column to which the pixel value of the interpolated pixel to be calculated belongs. First, as for the coefficient "16" in the table, calculation is performed for the product of the coefficient and the pixel value sum of the adjoining pixels belonging to the same row as the coefficient. As for each of the coefficients "1", "−4", "4", and "−1" other than the coefficient "16", calculation is performed for the product of each of the coefficients and the pixel value difference of the adjoining pixels belonging to the same row as each of the coefficients. Then, the intermediate pixel value "b" of the interpolated pixel is calculated by adding these products in the column direction.

Here one example is given for the intermediate pixel value b[m+3]. Looking the table, from top to bottom, at the column of the intermediate pixel value b[m+3], first, a value "a[k−2]−a [k−1]" is given in the calculation of the coefficient "1"; a value "−4*(a[k−1]−a [k])" is added in the calculation of the coefficient "−4"; a value "16*(a [k]+a [k+1])" is added in the calculation of the coefficient "16"; a value "4*(a[k+1]−a [k+2])" is added in the calculation of the coefficient "4"; and a value "−(a[k+2]−a [k+3])" is added in the calculation of the coefficient "−1". The result obtained by the above calculation becomes same as Equation 3.

In the flow chart of the pixel interpolating method of the present embodiment shown in FIG. 1, the flow possesses loop structure that is composed of a series of processing from Step S13 to Step S24. One loop of the processing corresponds to the processing for one row of the table shown in FIG. 2.

For example, in the processing of a row which is surrounded by the dashed lines in the table of FIG. 2, where the pixel value a[k−1] of the pixel at the location "k−1" and the pixel value a[k] of the pixel at the location "k−1" make an adjoining pixel pair, the following calculations are performed: The pixel value a[k] of the pixel at the location "k" is read out; the difference (a[k−1]−a [k]) is calculated from the pixel value a[k] and the pixel value a[k−1] of the pixel at the location "k−1", the latter pixel value having been already read out; the difference is subtracted from the intermediate pixel value b[m]; a value four times as large as the difference is added to the intermediate pixel value b[m]; a value 16 times as large as the sum (a[k−1]+a [k]) is added to the intermediate pixel value b[m+2]; a value four times as large as the difference is subtracted from the intermediate pixel value b[m+3]; and the difference is added to the intermediate pixel value b[m+4].

The processing explained above is described in more detail referring to FIG. 1.

At Step S10 shown in FIG. 1, pixel interpolating processing starts.

At Step S11, initial values are set to the variable "k" and the variable "m".

At Step S12, processing prior to the loop processing is performed as prologue processing.

At Step S13, the pixel value a[k] of the pixel of the location "k" is read out. Here, the pixel value a[k−1] of the pixel of at the location "k−1" adjoining the pixel at the location "k" is already read out in the previous loop processing, and the value is stored. Alternatively, when the present processing is the first loop processing, the pixel value a[k−1] is already read out in the prologue processing of Step S12, and the value is stored.

At Step S14, a sum of the pixel value a[k−1] and the pixel value a[k] is left-shifted by 4 bits (equivalent to a value 16 times as large as the sum), then added to the intermediate pixel value b[m+2]. The processing corresponds to the processing related to the coefficient "16" of the row that is surrounded by the dashed lines in the table shown in FIG. 2.

At Step S15, the difference (a[k−1]−a [k]) between the pixel value a[k−1] and the pixel value a[k] is calculated, and is used to replace the intermediate pixel value b[m+4]. The processing corresponds to the processing related to the coefficient "1" of the row that is surrounded by the dashed lines in the table shown in FIG. 2.

At Step S16, whether the absolute value (|a[k−1]−a [k]|) of the difference of the pixel values of the adjoining pixels (that is, |b[m+4]|) is equal to or less than the specific value "b0" is judged.

When the judgment result of Step S16 is "Yes" (the absolute value is equal to or less than the specific value), Step S17 to Step S20 are skipped, and the control moves to Step S21. When the judgment result is "No" (the absolute value exceeds the specific value), the control moves to Step S17.

At Step S17, the difference (a[k−1]−a [k]) of the pixel values of the adjoining pixels (that is, b [m+4]) is subtracted from the intermediate pixel value b [m]. Thereby, the intermediate pixel value b[m] of the interpolated pixel is determined. The processing corresponds to the processing related to the coefficient "−1" of the row which is surrounded by the dashed lines in the table shown in FIG. 2.

At Step S18, the difference of the pixel values of the adjoining pixels is left-shifted by 2 bits (equivalent to a value four times as large as the difference), and stored into the register "r".

At Step S19, the value of the register "r" is added to the intermediate pixel value b[m+1]. The processing corresponds to the processing related to the coefficient "4" of the row that is surrounded by the dashed lines in the table shown in FIG. 2.

At Step S20, the value of the register "r" is subtracted from the intermediate pixel value b [m+3]. The processing corresponds to the processing related to the coefficient "−4" of the row which is surrounded by the dashed lines in the table shown in FIG. 2.

By the processing from Step S13 to Step S20 mentioned above, the processing belonging to the row that is surrounded by the dashed lines in the table shown in FIG. 2 is performed.

At Step S21, normalization processing and saturation manipulation of the intermediate pixel value b [m] are performed to obtain the pixel value c [m].

At Step S22, the pixel value c [m] is outputted.

At Step S23, the variable "m" and the variable "k" are respectively increased by the value "1" for the next loop.

At Step S24, whether the series of the loop processing is completed or not is judged. When the judgment result is "No" (the loop processing is not completed), the control returns to Step S13, and the loop processing from Step S13 to Step S24 is repeated. When the judgment result is "Yes" (the loop processing is completed), the control moves to Step S25.

At Step S25, the unfinished processing is performed as the epilogue processing. Then, the series of the pixel interpolating processing is completed at Step S26.

As explained above, in the pixel interpolating method of the present embodiment, when the absolute value of the difference of the pixel values of the adjoining pixels is equal to or less than the predetermined value, the processing from Step S17 to Step S20 of FIG. 1 is skipped, in order not to perform the operation of the term related to the difference. As a result, the operation amount necessary for the pixel interpolating processing is reduced. Therefore, it is possible to improve the speeding of the pixel interpolating processing. Furthermore, the reduction in the operation amount is expected to lead to the reduction of the power consumption needed for the operation.

The predetermined value "b0" is set, for example, to a value equivalent to the least significant bit of a binary code, by which the pixel value of the pixel to be processed is represented. Alternatively, the predetermined value "b0" is set to a value close to zero, or, a value of a noise level.

More simply, the predetermined value may be assumed that b0=0. Then, whether the difference (a[k−1]−a [k]) is zero or not may be judged at Step S16.

When the pixel interpolating method of the present embodiment is applied to the motion picture encoding, it is expected that the effectiveness of the above-mentioned skipped processing is more clearly exhibited. This is due to the features of the motion picture encoding, in which high frequency components of a picture are removed in a low bit rate, thereby producing many pairs of the adjoining pixels that possess zero difference of the pixel values.

Furthermore, according to the pixel interpolating method of the present embodiment, as for calculating the pixel value of the interpolated pixel, the following sets of processing are performed in one loop processing: read-out of the pixel value of one pixel, calculation of the difference and sum of the pixel values of the one pixel and one adjoining pixel, and operation relating to the difference and sum. By repeating the loop processing, the pixel values of the consecutive interpolated pixels are calculated efficiently without performing unnecessary overlapped calculation. Therefore, the pixel interpolating method of the present embodiment is very efficient and useful in realizing speedy processing of pixel interpolation, because of avoiding the unnecessary overlapped calculation, when compared with the conventional art that must calculate Equation 3 or Equation 4 every time when the pixel values of the interpolated pixels are calculated.

Here, a special attention should be called to the fact that the above-mentioned effectiveness of the pixel interpolating method of the present embodiment can not be simply acquired by converting Equation 1 to the forms of Equation 3 or Equation 4; however, the effectiveness can be acquired only when the structure of the pixel interpolating processing by the pixel interpolating method of the present embodiment is performed according to the flow chart of FIG. 1.

Moreover, the coefficient of each term of Equation 3 is the exponentiation of 2, thereby each multiplication can be instead performed by the bit-shift processing, as shown in Equation 4. It should be also noted that this fact contributes for the pixel interpolating method of the present embodiment to improve the speeding of the processing.

In addition, the flow chart shown in FIG. 1 is just an example in practicing the present invention. Therefore, the control structure and the order of the processing steps, etc. are not limited to the case shown in FIG. 1, and they may be suitably changed according to the processing based on Equation 3 or Equation 4.

Embodiment 2

Figure 3:
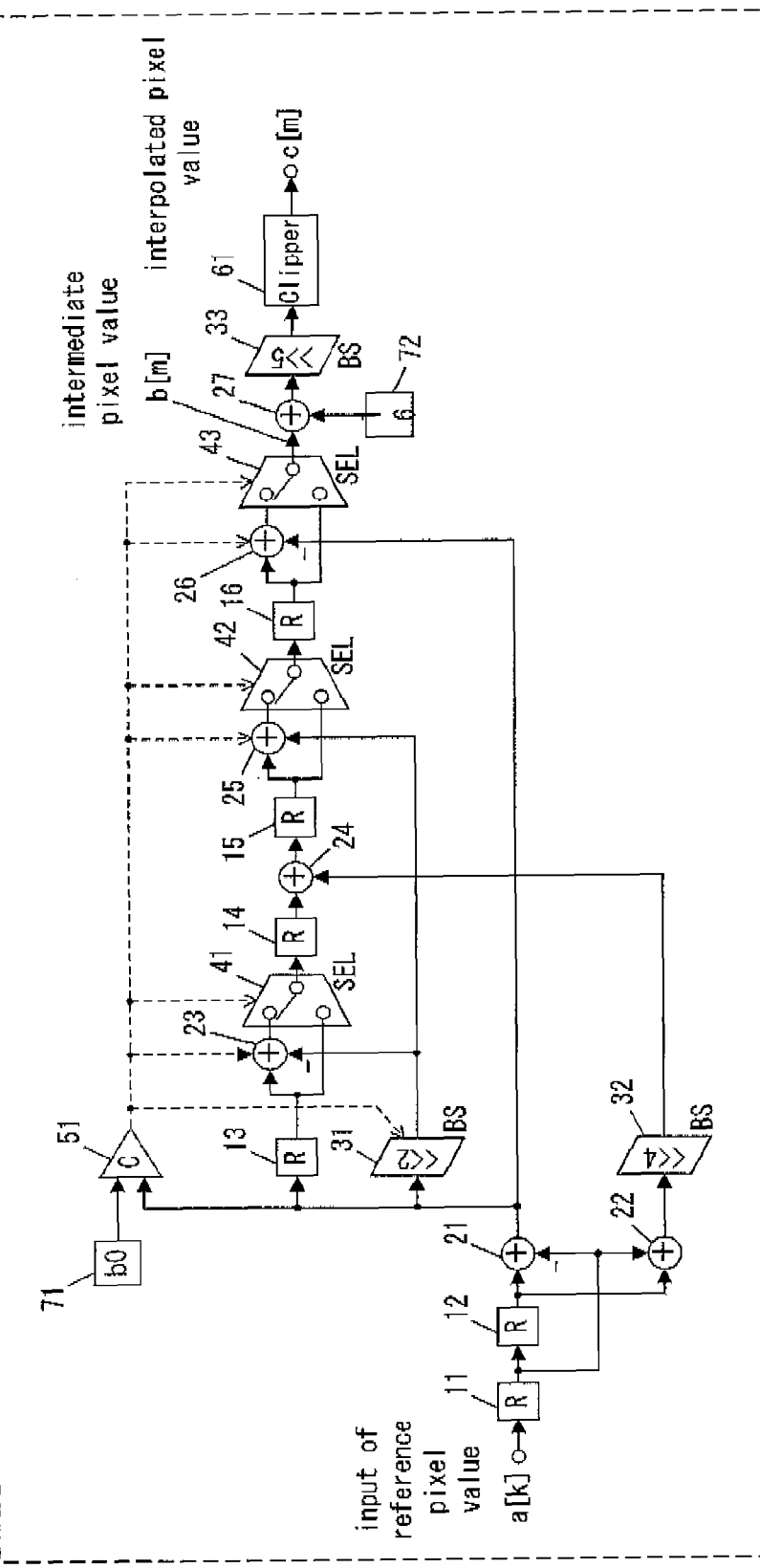
FIG. 3 is a block diagram of a pixel interpolating device in Embodiment 2 of the present invention.

FIG. 3 is a block diagram of a pixel interpolating device in Embodiment 2 of the present invention. The pixel interpolating device of the present embodiment practically performs the pixel interpolating method of the present invention described in Embodiment 1 of the present invention.

As shown in FIG. 3, the pixel interpolating device of the present embodiment comprises registers 11 to 16, adders 21 to 27, bit shifters 31 to 33, selectors 41 to 43, a comparator 51, a clipper 61, and constant units 71 and 72. In FIG. 3, the register is written as a symbol "R", the adder as a symbol "+", the bit shifter as a symbol "BS", the selector as a symbol "SEL", and the comparator as a symbol "C".

In the following, operation of the pixel interpolating device of the present embodiment is explained.

In FIG. 3, the registers 11 to 16 are controlled by a control signal (not shown in the figure) in inputting data. From a plurality of reference pixels, the pixel value a[k] of the pixel at the location "k" is inputted into the register 11 in synchronization with the control signal. The pixel values of the reference pixels are inputted into the register 11, one pixel value per cycle of the control signal, in the order of the array of the reference pixels. In other words, the pixel values a [k−5], a [k−4], a [k−3], a [k−2] . . . are inputted in this order. Therefore, the pixel values of the adjoining pixels are respectively stored in the register 11 and the register 12. The adder 21 calculates the difference of the pixel values of the adjoining pixels, and the adder 22 calculates the sum of the pixel values of the adjoining pixels. (The adder 21 functions as a subtractor. It is the same for the adder 23 and the adder 26.)

The following explains a case in which the pixel value a[k+3] is stored in the register 11 in a certain cycle of the control signal.

At this cycle, the pixel values a [k+3] and a [k+2] are stored in the register 11 and the register 12, respectively. The adder 21 outputs the difference (a[k+2]−a [k+3]) of the pixel values of the adjoining pixels. The adder 22 outputs the sum (a [k+2]+a [k+3]) of the pixel values of the adjoining pixels.

The comparator 51 compares the absolute value (|a[k+2]−a [k+3]|) of the difference of the pixel values that is outputted by the adder 21 and a constant "b0" that is set in the constant unit 71, and outputs a signal indicating whether the absolute value of the difference is equal to or less than the constant "b0". When the signal outputted by the comparator 51 indicates that the absolute value of the difference exceeds the constant "b0", each of the selectors 41, 42, and 43 selects each of the outputs of the adder 23, 25, and 26.

The bit shifter 31 bit-shifts the difference of the pixel values outputted by the adder 21 by 2 bits to the left (that is to multiply 4 times), and outputs the result. The bit shifter 32 bit-shifts the sum of the pixel values outputted by the adder 22 by 4 bits to the left (that is to multiply 16 times), and outputs the result.

The difference (a[k+1]−a [k+2]) of the pixel values of the adjoining pixels one cycle before is stored in the register 13. By subtracting the output of the bit shifter 31 from the value stored in the register 13 by the adder 23, the value of Equation 6 is determined. The value of Equation 6 is outputted by the selector 41.

$$a[k+1]-a[k+2]-4*(a[k+2]-a[k+3]) \quad \text{(Equation 6)}$$

The output of the adder 23 one cycle before or the value of Equation 7 is stored in the register 14.

$$a[k]-a[k+1]-4*(a[k+1]-a[k+2]) \quad \text{(Equation 7)}$$

By adding the value stored in the register 14 and the output of the bit shifter 32 by the adder 24, the value of Equation 8 is determined.

$$a[k]-a[k+1]-4*(a[k+1]-a[k+2])+16*(a[k+2]+a[k+3]) \quad \text{(Equation 8)}$$

The output of the adder 24 one cycle before or the value of Equation 9 is stored in the register 15.

$$a[k-1]-a[k]-4*(a[k]-a[k+1])+16*(a[k+1]+a[k+2]) \quad \text{(Equation 9)}$$

By adding the value stored in the register 15 and the output of the bit shifter 31 by the adder 25, the value of Equation 10 is determined. The value of Equation 10 is outputted by the selector 42.

$$a[k-1]-a[k]-4*(a[k]-a[k+1])+16*(a[k+1]+a[k+2])+ \\ 4*(a[k+2]-a[k+3]) \quad \text{(Equation 10)}$$

The output of the selector 42 one cycle before or the value of Equation 11 is stored in the register 16.

$$a[k-2]-a[k-1]-4*(a[k-1]-a[k])+16*(a[k]+a[k+1])+4*(a[k+1]-a[k+2]) \quad \text{(Equation 11)}$$

By subtracting the difference of the pixel values outputted by the adder 21 from the value stored in the register 16 by the adder 26, the value of Equation 12 is determined. The determined value of Equation 12 is equal to the right hand term of Equation 3. The determined value is then outputted from the selector 43 as the intermediate pixel value b[m] of the interpolated pixel.

$$a[k-2]-a[k-1]-4*(a[k-1]-a[k])+16*(a[k]+a[k+1])+4*(a[k+1]-a*[k+2])-(a[k+2]-a[k+3]) \quad \text{(Equation 12)}$$

The adder 27 adds the constant "16" set in the constant unit 72 to the intermediate pixel value outputted from the selector 43. The bit shifter 33 bit-shifts the result to the right by 5 bits (that is equivalent to dividing by 32). The clipper 61 performs the saturation manipulation to the bit-shifted result. After all, the pixel value c[m] of the interpolated pixel (the value of Equation 5) is obtained.

In the series of the above-mentioned processing, when the signal outputted by the comparator 51 indicates that the absolute value of the difference of the pixel values of the adjoining pixels is equal to or less than the constant "b0", the selectors 41, 42, and 43 select outputs of the register 13, 15, and 16, respectively, and the adders 23, 25, and 26, and the bit shifter 31 do not perform the operation.

As explained above, when the absolute value of the difference of the pixel values of the adjoining pixels is equal to or less than the predetermined value (that is, the constant "b0"), the adders 23, 25, and 26, and the bit shifter 31 do not perform the operation; therefore, the power consumption that is otherwise necessary for the operation by these operators can be reduced.

Moreover, by converting 6-tap filtering for the interpolation of the pixel value into the form of Equation 3, the terms of Equation 3 are changed to possess the coefficients "4" and "16" that are the exponentiation of 2. Thereby, it becomes possible to perform the two pieces of multiplication operation only by a 2-bit left shifter and a 4-bit left shifter, respectively. Furthermore, in normalization of the intermediate pixel value of the interpolated pixel, the denominator of the division is the constant "32" that is the exponentiation of 2; therefore, it is possible to perform the division operation by a 5-bit right shifter. Since the multiplication operation and the division operation in the pixel interpolating device of the present embodiment can be performed by the bit shifters as mentioned above, it is possible to reduce the circuit scale of the pixel interpolating device.

Embodiment 3

Figure 4:
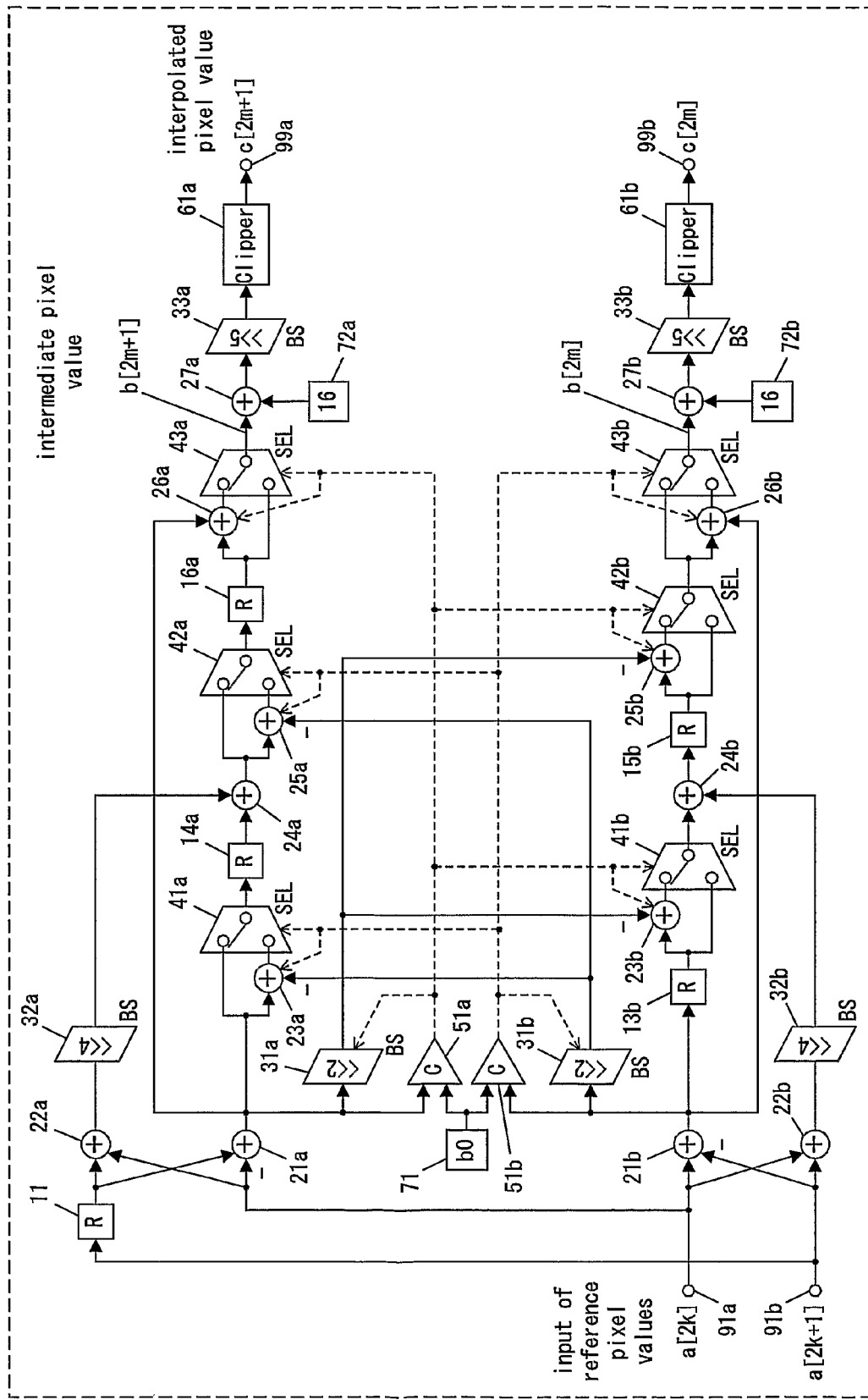
FIG. 4 is a block diagram of a pixel interpolating device in Embodiment 3 of the present invention.

FIG. 4 is a block diagram of a pixel interpolating device in Embodiment 3 of the present invention. The pixel interpolating device of the present embodiment is operable to process at once the picture data having the 16-bit structure, in which two pixel values having the 8-bit structure are packed.

Basically, the pixel interpolating device of the present embodiment is structured by arranging in parallel two pieces of the pixel interpolating device of Embodiment 2 of the present invention shown in FIG. 3 and omitting the common parts thereof. In other words, the pixel interpolating device of the present embodiment includes an upper part that determines the pixel values of the odd-numbered interpolated pixels, a lower part that determines the pixel values of the even-numbered interpolated pixels, and the other common parts. The upper part comprises registers 11, 14a, and 16a, adders 21a to 27a, bit shifters 31a to 33a, selectors 41a to 43a, a comparator 51a, a clipper 61a, and a constant unit 72a. The lower part comprises registers 13b and 15b, adders 21b to 27b, bit shifters 31b to 33b, selectors 41b to 43b, a comparator 51b, a clipper 61b and a constant unit 72b. The common part comprises a constant unit 71.

In addition, in FIG. 4, the register is written as a symbol "R", the adder is written as a symbol "+", the bit shifter is written as a symbol "BS", the selector is written as a symbol "SE", and the comparator is written as a symbol "C".

Figure 5:
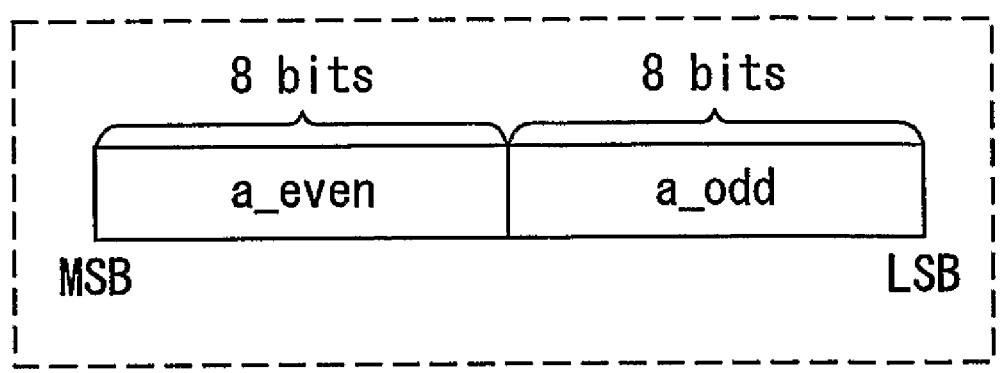
FIG. 5 is a layout illustration showing two packed pixel values in Embodiment 3 of the present invention.

FIG. 5 is a layout illustration showing two packed pixel values in Embodiment 3 of the present invention. The image data having the 16-bit structure illustrated in FIG. 5 contains a pixel value "a_even" of the even-numbered pixel in the upper 8 bits thereof, and a pixel value "a_odd" of the odd-numbered pixel in the lower 8 bits thereof. The arrangement of the two packed pixel values may differ from that of FIG. 5.

The operation of the pixel interpolating device of the present embodiment is outlined in the following, with reference to FIG. 4.

The pixel value a[2k], which is the upper pixel data of the 16-bit pixel data shown in FIG. 5, is inputted into an input terminal 91a. The pixel value a[2k+1], which is the lower pixel data of the 16-bit pixel data, is inputted into an input terminal 91b. The pixel value c[2m+1] of the odd-numbered interpolated pixel is outputted to an output terminal 99a. The pixel value c[2m] of the even-numbered interpolated pixel is outputted to an output terminal 99b.

In the pixel interpolating device of the present embodiment, one piece of the 16-bit picture data, in which two pixel values are packed, is inputted every cycle of the control signal. In other words, the odd-numbered pixel values are inputted into the input terminal 91a, in the order of the pixel values a[2k−3], a[2k−1], a[2k+1], a[2k+3], . . . , for every cycle. The even-numbered picture values are inputted into the input terminal 91b, in the order of the pixel values a[2k−2], a[2k], a[2k+2], a[2k+4], . . . , for every cycle.

The following explains a case in which, in a certain cycle of the control signal, the pixel value a[2k+2] is inputted to the input terminal 91a, the pixel value a[2k+3] is inputted to the input terminal 91b, and the pixel value a[2k+1] one cycle before is stored in the register 11.

At this cycle, the adder 21a calculates the difference (a[2k+1]−a [2k+2]) of the pixel values of the adjoining pixels. The adder 22a calculates the sum (a [2k+1]+a [2k+2]) of the pixel values of the adjoining pixels. The adder 21b calculates the difference (a[2k+2]−a [2k+3]) of the pixel values of the adjoining pixels. The adder 22b calculates the sum (a [2k+2]+a [2k+3]) of the pixel values of the adjoining pixels.

The bit shifters, the adders, the registers, and the clippers, which are located in latter stages than the adders 21a, 21b, 22a, and 22b, perform the almost same operation as the corresponding units of the pixel interpolating device of Embodiment 2 of the present invention. Therefore, the further description of the operation thereof is omitted.

As the result of the above processing, the selector 43a outputs the value of Equation 13 as the intermediate pixel value b[2m+1] of the odd-numbered interpolated pixel. The selector 43b outputs the value of Equation 14 as the intermediate pixel value b[2m] of the even-numbered interpolated pixel.

$$b = (a[2k-3] - a[2k-2]) - \\ 4*(a[2k-2] - a[2k-1]) + 16*(a[2k-1] + a[2k]) + \\ 4*(a[2k] - a[2k+1]) - (a[2k+1] - a[2k+2])$$ (Equation 13)

$$b = (a[2k-2] - a[2k-1]) - \\ 4*(a[2k-1] - a[2k]) + 16*(a[2k] + a[2k+1]) + \\ 4*(a[2k+1] - a[2k+2]) - (a[2k+2] - a[2k+3])$$ (Equation 14)

The normalization processing and the saturation manipulation according to Equation 5 are performed for the intermediate pixel value of Equation 13 outputted from the selector 43a and the intermediate pixel value of Equation 14 outputted from the selector 43b at the respective latter stages. Eventually, the pixel value c[2m+1] of the odd-numbered interpolated pixel is outputted to the output terminal 99a. The pixel value c[2m] of the even-numbered interpolated pixel is outputted to the output terminal 99b.

In the series of the above-mentioned processing, when the signal outputted by the comparator 51a indicates that the absolute value of the difference of the pixel values of the adjoining pixels is greater than the constant "b0", the selector 41b selects the output of the adder 23b, the selector 42b selects the output of the adder 25b, and the selector 43a selects the output of the adder 26a. When the signal outputted by the comparator 51b indicates that the absolute value of the difference of the pixel values of the adjoining pixels is greater than the constant "b0", the selector 41a selects the output of the adder 23a, the selector 42a selects the output of the adder 25a, and the selector 43b selects the output of the adder 26b.

On the other hand, when the signal outputted by the comparator 51a indicates that the absolute value of the difference of the pixel values of the adjoining pixels is equal to or less than the constant "b0", the selector 41b selects the output of the register 13b, the selector 42b selects the output of the register 15b, and the selector 43a selects the output of the register 16a. The bit shifter 31a, the adder 23b, the adder 25b, and the adder 26a do not perform the operation.

When the signal outputted by the comparator 51b indicates that the absolute value of the difference of the pixel values of the adjoining pixels is equal to or less than the constant "b0", the selector 41a selects the output of the adder 21a, the selector 42a selects the output of the adder 24a, and the selector 43b selects the output of the selector 42b. The bit shifter 31b, the adder 23a, the adder 25a, and the adder 26b do not perform the operation.

As explained above, when the absolute value of the difference of the pixel values of the adjoining pixels is equal to or less than the predetermined value (that is, the constant "b0"), the operating units related to the operation of the difference do not perform the operation; therefore, the power consumption that is otherwise necessary for the operation by these operators can be reduced.

It must have been clarified from the above explanation that the pixel interpolating device of the present embodiment can enjoy equally the features that the pixel interpolating device of Embodiment 2 of the present invention enjoys.

Moreover, if the pixel interpolating device of the present embodiment is extended from the current twofold parallel structure to a fourfold parallel structure, it is easy to realize an extended pixel interpolating device which is operable to input pixel data having a 32-bit structure in which four pieces of 8-bit structure pixel values are packed, and to perform the pixel interpolating processing of four interpolated pixels at once.

In Embodiment 1 to Embodiment 3 described above, the explanation is given along the generation of the interpolated pixel by the 6-tap filter in conformity to the H.264 encoding standard. However, the present invention is not limited to the generation of the interpolated pixel according to the H.264 encoding standard, but can be applied to the generation of interpolated pixels and the motion compensation by other kinds of tap filter processing. In these applications, the above-mentioned effects are also equally enjoyed.

Embodiment 4

Figure 6:
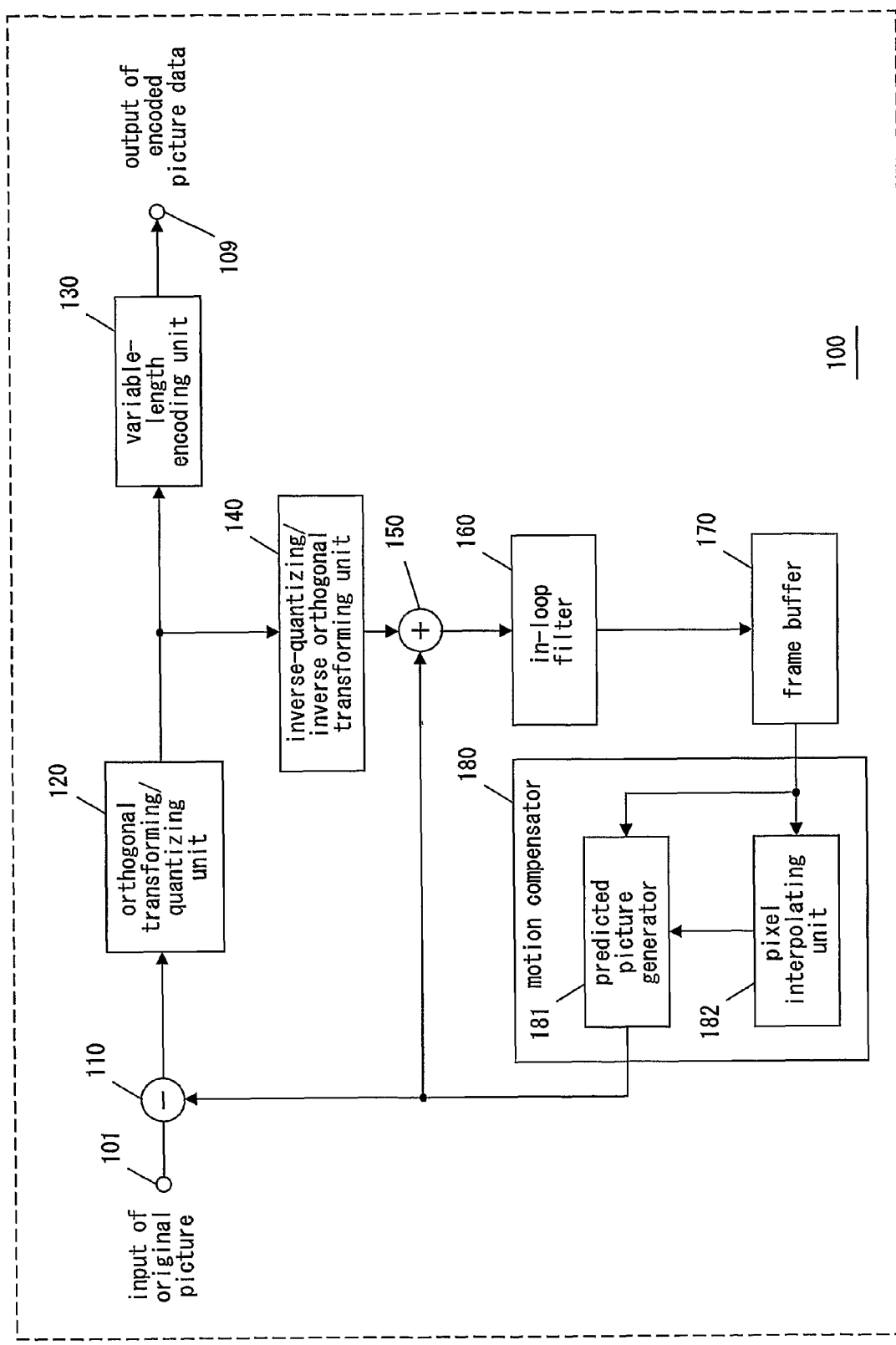
FIG. 6 is a block diagram of a motion picture encoding device in Embodiment 4 of the present invention.

FIG. 6 is a block diagram of a motion picture encoding device in Embodiment 4 of the present invention. A motion picture encoding device 100 of the present embodiment shown in FIG. 6 comprises a subtractor 110, an orthogonal transforming/quantizing unit 120, a variable-length encoding unit 130, an inverse quantizing/inverse orthogonal transforming unit 140, an adder 150, an in-loop filter 160, a frame buffer 170, and a motion compensator 180. The motion compensator 180 comprises a predicted picture generator 181 and a pixel interpolating unit 182.

FIG. 6 illustrates a part of the processing blocks of the motion picture encoding device 100 of the present embodiment; FIG. 6 illustrates only the processing blocks related to the inter-picture prediction encoding, but excluding the processing blocks related to the intra-picture prediction encoding.

The pixel interpolating unit 182, which the motion picture encoding device 100 of the present embodiment comprises, is the pixel interpolating device of Embodiment 2 or the pixel interpolating device of Embodiment 3 of the present invention.

The operation of the motion picture encoding device 100 of the present embodiment is explained in the following.

The original picture inputted from an input terminal 101 is processed by the subtractor 110 to calculate the difference from the predicted picture outputted by the motion compensator 180. The calculated difference or the remainder is outputted to the orthogonal transforming/quantizing unit 120.

The orthogonal transforming/quantizing unit 120 performs orthogonal transformation (for example, discrete cosine transformation) to the remainder outputted by the subtractor 110, and quantizes the transformed coefficients obtained, thereby outputting the quantized, transformed coefficients.

The variable-length encoding unit 130 performs variable length encoding to the quantized, transformed coefficients outputted by the orthogonal transforming/quantizing unit 120, thereby outputting the encoded result as encoded picture data to an output terminal 109.

Simultaneously, the inverse quantizing/inverse orthogonal transforming unit 140 performs inverse quantization/inverse orthogonal transformation to the quantized, transformed coefficients, thereby obtaining a restored remainder. The adder 150 adds the restored remainder to the predicted picture outputted by the motion compensator 180, thereby restoring a reconstructed picture.

The reconstructed picture is removed block noise by the in-loop filter 160, and stored in the frame buffer 170 as a decoded picture.

The motion compensator 180 reads out the decoded picture as a reference picture from the frame buffer 170, performs the operation in the pixel interpolating unit 182 based on the information of the motion vector (not shown in the figure) to calculate the interpolated pixel, and generates, in the predicted picture generator 181, the predicted picture for which the motion compensation is made.

In the motion picture encoding device 100 of the present embodiment, among the processing from performing the variable length encoding to the inputted original picture up to outputting the encoded picture data, the processing in the motion compensator 180, especially, the pixel interpolating processing in the pixel interpolating unit 182, occupies a large percentage of the entire processing. Therefore, use of the pixel interpolating device of Embodiment 2 or Embodiment 3 of the present invention for the pixel interpolating unit 182 makes it possible to realize high-speed pixel interpolating processing, and hence the motion compensator 180 can perform the motion compensation processing at high speed. As a result, it is possible to provide the motion picture encoding device 100, which is operable to process at high speed. Furthermore, the motion picture encoding device 100 thus provided possesses the features that the power consumption is low, since the pixel interpolating unit 182 is constituted so as to avoid unnecessary operation.

The motion picture encoding device 100 of the present embodiment can efficiently encode the inputted original picture to variable length coded picture data in conformity to the H.264 standard.

The motion picture encoding device 100 of the present embodiment is not limited to the variable length encoding in conformity to the H.264 encoding standard. By using other kinds of tap filter processing, the motion picture encoding device 100 can be extendedly applied to the variable length encoding according to the other encoding standards.

Embodiment 5

Figure 7:
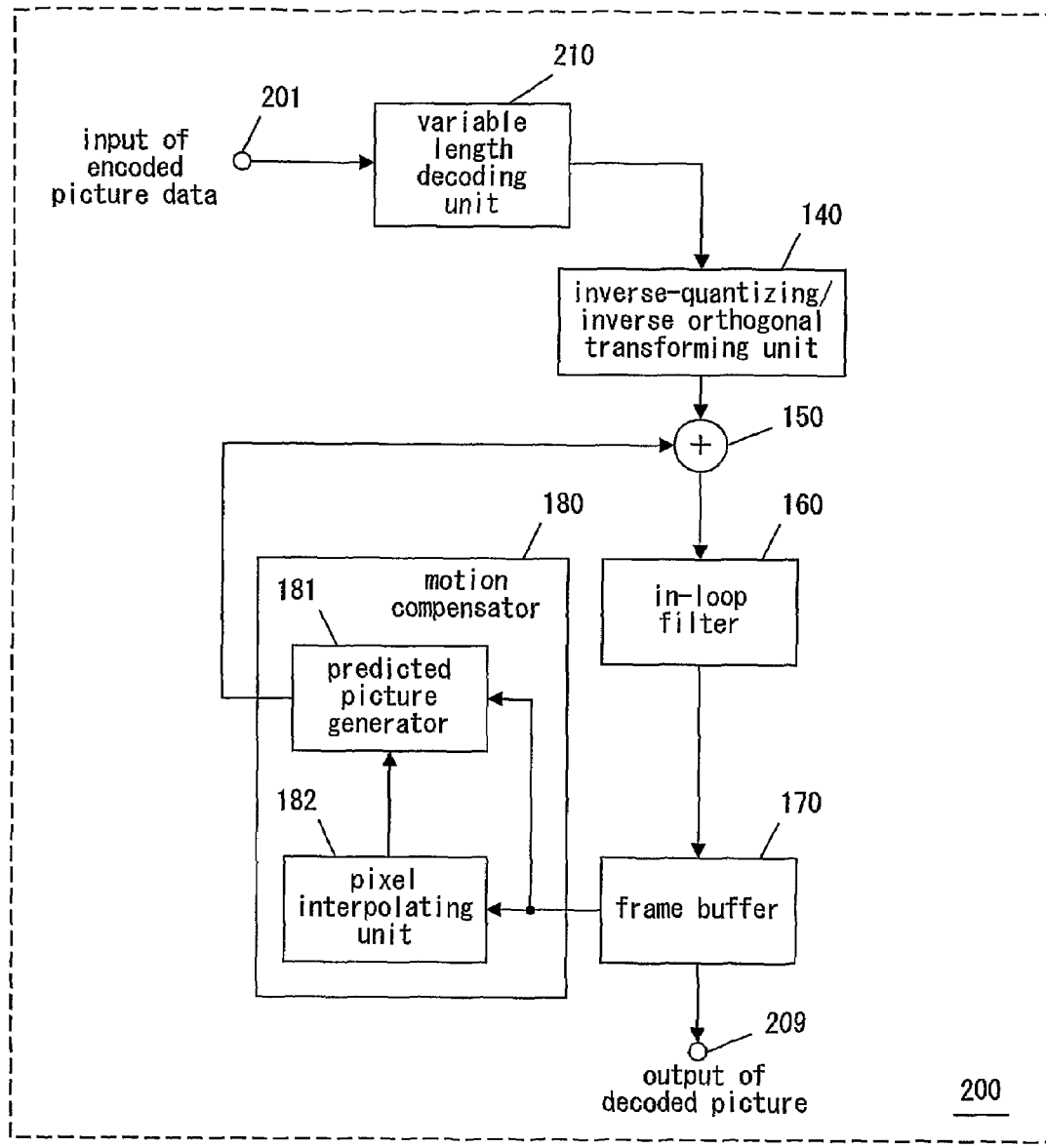
FIG. 7 is a block diagram of a motion picture decoding device in Embodiment 5 of the present invention.
Figure 8:
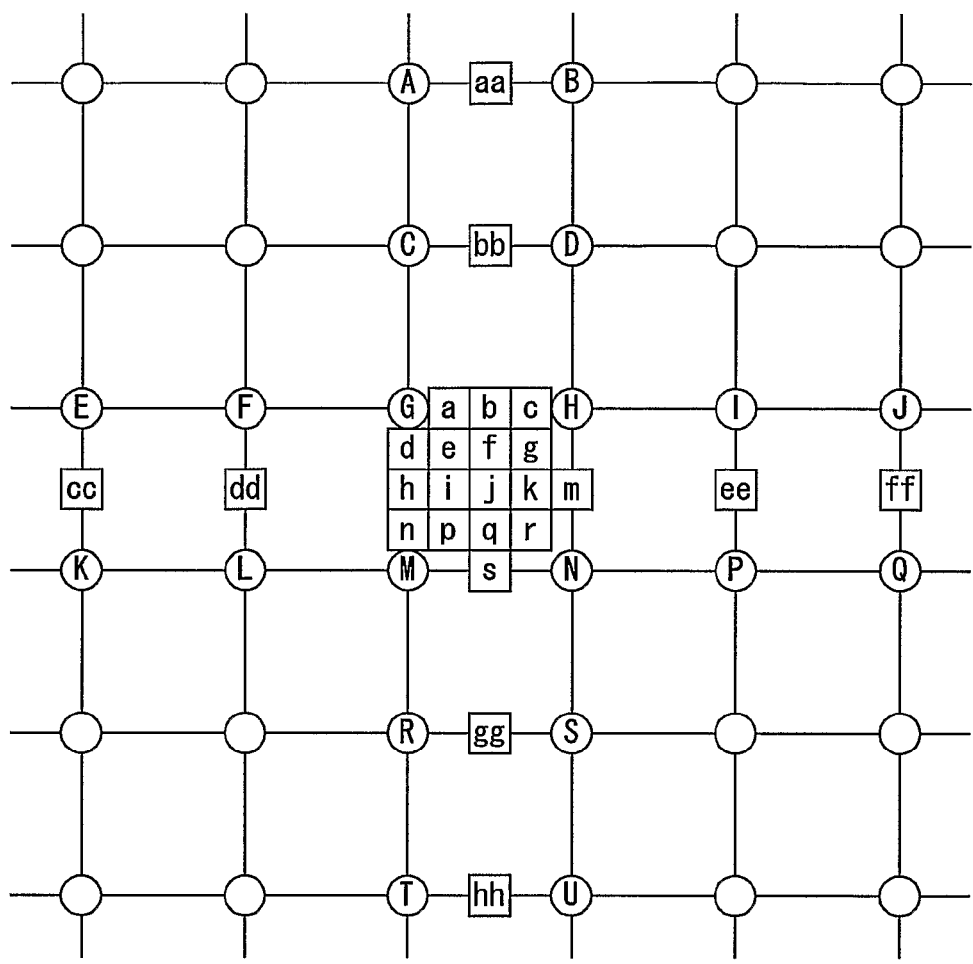
FIG. 8 illustrates location relationship of full-pels, interpolated half-pels, and interpolated quarter-pels.
Figure 9:
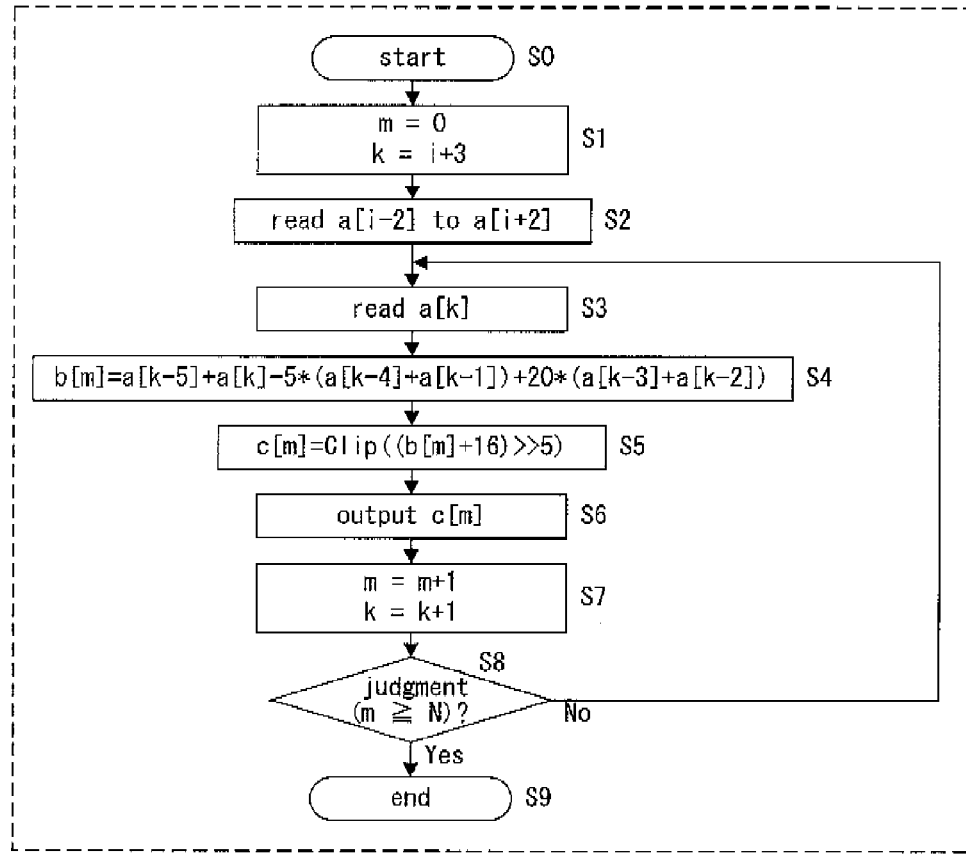
FIG. 9 is a flow chart showing an example of a conventional pixel interpolating method operable to determine a pixel value of an interpolated pixel by a 6-tap filter.
Figure 10:
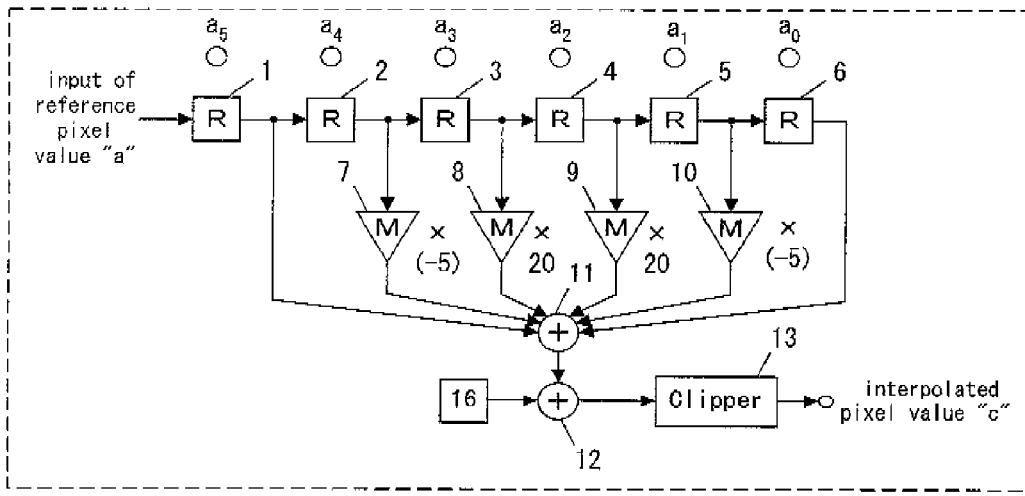
FIG. 10 is a block diagram of a conventional pixel interpolating device by a 6-tap filter.

FIG. 7 is a block diagram of a motion picture decoding device in Embodiment 5 of the present invention. In FIG. 7, the same symbols are given to elements each having the same function as elements of FIG. 6 in order to omit explanation.

A motion picture decoding device 200 of the present embodiment shown in FIG. 7 comprises a variable length decoding unit 210, an inverse quantizing/inverse orthogonal transforming unit 140, an adder 150, an in-loop filter 160, a frame buffer 170, and a motion compensator 180. The motion compensator 180 comprises a predicted picture generator 181 and a pixel interpolating unit 182.

FIG. 7 illustrates a part of the processing blocks of the motion picture decoding device 200 of the present embodiment; FIG. 7 illustrates only the processing blocks related to the inter-picture prediction decoding, but excluding the processing blocks related to the intra-picture prediction decoding.

The pixel interpolating unit 182, which the motion picture decoding device 200 of the present embodiment comprises, is the pixel interpolating device of Embodiment 2 or the pixel interpolating device of Embodiment 3 of the present invention.

The operation of the motion picture decoding device 200 of the present embodiment is explained in the following.

The variable length encoded picture data fed into the input terminal 201 is decoded into quantized, transformed coefficients by the variable length decoding unit 210, and outputted to the inverse quantizing/inverse orthogonal transforming unit 140.

The inverse quantizing/inverse orthogonal transforming unit 140 performs the inverse quantization/inverse orthogonal transformation to the quantized, transformed coefficients decoded by the variable length decoding unit 210, thereby obtaining a remainder.

The adder 150 adds the remainder and the predicted picture outputted by the motion compensator 180, thereby generating a reconstructed picture.

The reconstructed picture is removed block noise by the in-loop filter 160, and temporarily stored in the frame buffer 170 as a decoded picture. The decoded picture is then outputted to an output terminal 209.

The motion compensator 180 reads out the decoded picture as a reference picture from the frame buffer 170, performs the operation in the pixel interpolating unit 182 based on the information of the motion vector (not shown in the figure) to calculate the interpolated pixel, and generates, in the predicted picture generator 181, the predicted picture for which the motion compensation is made.

In the motion picture decoding device 200 of the present embodiment, among the processing from decoding the variable length encoded picture data inputted and outputting the decoded picture, the processing in the motion compensator 180, especially, the pixel interpolating processing in the pixel interpolating unit 182, occupies a large percentage of the entire processing. Therefore, use of the pixel interpolating device of Embodiment 2 or Embodiment 3 of the present invention for the pixel interpolating unit 182 makes it possible to realize high-speed pixel interpolating processing, and hence the motion compensator 180 can perform the motion compensation processing at high speed. As a result, it is possible to provide the motion picture decoding device 200, which is operable to process at high speed. Furthermore, the motion picture decoding device 200 thus provided possesses the features that the power consumption is low, since the pixel interpolating unit 182 is constituted so as to avoid unnecessary operation.

The motion picture decoding device 200 of the present embodiment can efficiently decode the variable length encoded picture data in conformity to the H.264 standard The motion picture decoding device 200 of the present embodiment is not limited to the variable length decoding in conformity to the H.264 encoding standard. By using other kinds of tap filter processing, the motion picture decoding device 200 can be extendedly applied to the variable length decoding of other picture data encoded in conformity to the other encoding standards.

According to the present invention, it is possible to provide the pixel interpolating method and device in which reduction in the power consumption and speeding in the processing are both realized. The pixel interpolating device thus provided can be applied to purposes such as motion compensation in prediction encoding of a motion picture, or pixel generation in size-enlarging or size-reducing of a picture.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

INDUSTRIAL APPLICABILITY

The pixel interpolating method according to the present invention can be applied to a motion picture processing device, such as a camera-built-in cellular phone, which requires high-speed processing of motion pictures, and the related fields.

The invention claimed is:

1. A pixel interpolating method using tap filtering, comprising:
    adding one of pixel values of an adjoining pixel pair composed of two adjoining reference pixels to another of the pixel values thereof, thereby obtaining a pixel value sum of the adjoining pixel pair;
    subtracting one of the pixel values of the adjoining pixel pair from another of the pixel values thereof, thereby obtaining; a pixel value difference of the adjoining pixel pair is obtaining;
    judging whether an absolute value of the pixel value difference is greater than a predetermined value, thereby generating a judgment result; and
    performing a first multiplication to multiply a first coefficient to the pixel value sum, thereby obtaining a first product,
    wherein, when the judgment result is indicative that the absolute value of the pixel value difference is greater than the predetermined value, said pixel interpolating method further comprises:
    performing a second multiplication to multiply a plurality of second coefficients to the pixel value difference, thereby obtaining a plurality of second products; and
    performing a first addition/subtraction of the first product and the plurality of second products to each of a plurality of registers, thereby accumulating interpolated pixel values of a plurality of contiguous pixels to be interpolated, each of the plurality of registers being arranged in correspondence to each of the plurality of contiguous pixels to be interpolated, and
    wherein, when the judgment result is indicative that the absolute value of the pixel value difference is equal to or smaller than the predetermined value, said pixel interpolating method further comprises:
    performing a second addition/subtraction of the first product to a corresponding one of the plurality of registers, thereby accumulating interpolated pixel values of the plurality of contiguous pixels to be interpolated.

2. The pixel interpolating method as defined in claim 1, wherein said adding, said subtracting, said judging, said performing the first multiplication, said performing the second multiplication, said performing the first addition/subtraction, and said performing the second addition/subtraction are practiced to a plurality of adjoining pixel pairs in addition to the adjoining pixel pair, thereby obtaining each of the interpolated pixel values of the plurality of contiguous pixels to be interpolated.

3. The pixel interpolating method as defined in claim 1, wherein the predetermined value is equal to or smaller than a value defined by a lowest bit in binary representation of each pixel value of the pixels composing the adjoining pixel pair.

4. The pixel interpolating method as defined in claim 1, wherein the first coefficient and the plurality of second coefficients are coefficients composed of exponentiations of 2,
    wherein said performing the first multiplication bit-shifts the pixel value sum by a value of an exponent of the first coefficient, and
    wherein said performing the second multiplication bit-shifts the pixel value difference by a value of an exponent of a corresponding one of the plurality of second coefficients.

5. The pixel interpolating method as defined in claim 1, wherein the tap filtering employs tap coefficients of {1, −5, 20, 20, −5, 1} and performs filtering based on the tap coefficients, by using an expression of $$b[k]=((a[k-2]-a[k-1])-4*(a[k-1]-a[k])+16*(a[k]+a[k+1])+4*(a[k+1]-a[k+2])-(a[k+2]-a[k+3]))/32,$$

where $a[k]$ is a pixel value of a pixel located at a k-th position of the plurality of reference pixels, $b[k]$ is an interpolated pixel value of a pixel located at a k-th position of the plurality of contiguous pixels to be interpolated, and the variable "k" is an integer indicative of a position from a certain pixel as a reference point.

6. The pixel interpolating method as defined in claim 5, wherein the tap filtering comprises:
    a first step to input the pixel value $a[k]$;
    a second step to calculate a difference and sum of the pixel value $a[k]$ and a pixel value of an adjacent pixel $a[k-1]$ stored in a first register of the plurality of resisters, thereby storing the difference to a second register of the plurality of resisters, and adding the sum to a third register of the plurality of resisters after left-shifting by 4 bits;
    a third step to judge whether an absolute value of the difference is greater than a predetermined value, thereby generating a judgment result;
    a fourth step to subtract a value stored in the second register from a value stored in a fourth register of the plurality of resisters;
    a fifth step to left-shift a value stored in the second register by 2 bits, thereby adding the left-shifted value to a fifth register of the plurality of resisters, and subtracting the left-shifted value from a sixth register of the plurality of resisters; and
    a sixth step to output a value stored in the fourth register as the interpolated pixel value of the pixel located at the k-th position, and to store the pixel value $a[k]$ to the first register,
    wherein, when the judgment result is indicative that the absolute value of the difference is greater than the predetermined value, a series of loop processing composed of the first, the second, the third, the fourth, the fifth, and the sixth steps is practiced, and
    wherein, when the judgment result is indicative that the absolute value of the difference is equal to or smaller than the predetermined value, a series of loop processing composed of the first, the second, the third, and the sixth steps is practiced.

7. The pixel interpolating method as defined in claim 6, wherein the predetermined value is equal to or smaller than a value defined by a lowest bit in binary representation of the pixel value $a[k]$.

8. A pixel interpolating device comprising:
    an adding unit that adds one of pixel values of an adjoining pixel pair composed of two adjoining reference pixels to another of the pixel values thereof, thereby obtaining a pixel value sum of the adjoining pixel pair;
    a subtracting unit that subtracts one of the pixel values of the adjoining pixel pair from another of the pixel values thereof, thereby obtaining a pixel value difference of the adjoining pixel pair;
    a judging unit that judges whether an absolute value of the pixel value difference is equal to or smaller than a predetermined value;
    a plurality of registers;
    a first multiplying unit that multiplies a predetermined coefficient to the pixel value sum;
    a second multiplying unit that multiplies a predetermined coefficient to the pixel value difference; and
    a plurality of adding/subtracting units operable that add or subtract from each of said plurality of registers the pixel value difference calculated by said subtracting unit or the multiplication results calculated by said first multiplying unit and said second multiplying unit, and to send the calculation results to respectively subsequent ones of said plurality of registers, wherein, when said judging unit determines that the absolute value of the pixel value difference is equal to or smaller than the predetermined value, said judging unit controls said second multiplying unit and said plurality of adding/subtracting units to skip processing related to the adjoining pixel pair for which the absolute value of the pixel value difference is judged to be equal to or smaller than the predetermined value.

\* \* \* \* \*